United States Patent Office  3,457,957
Patented July 29, 1969

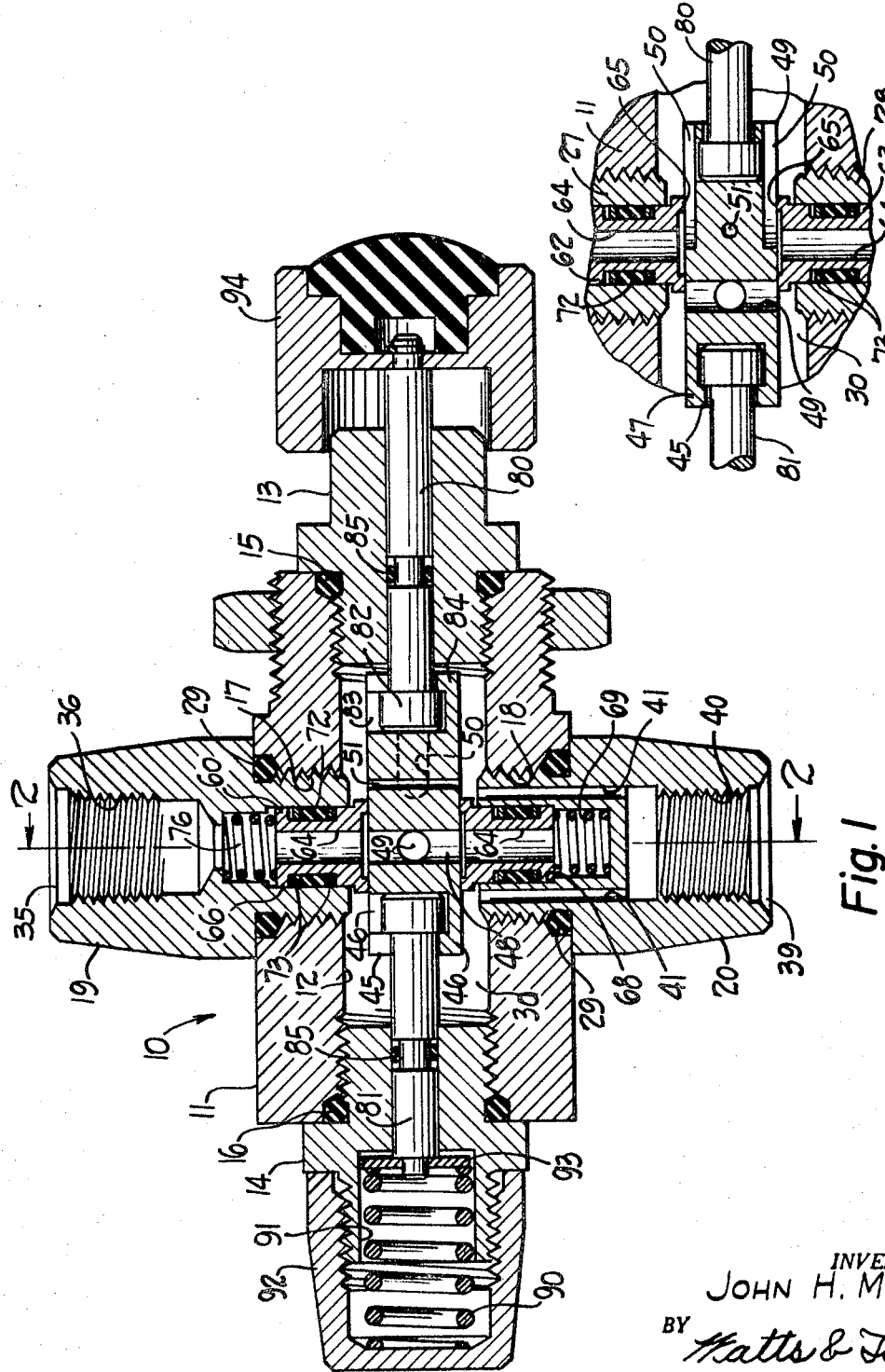

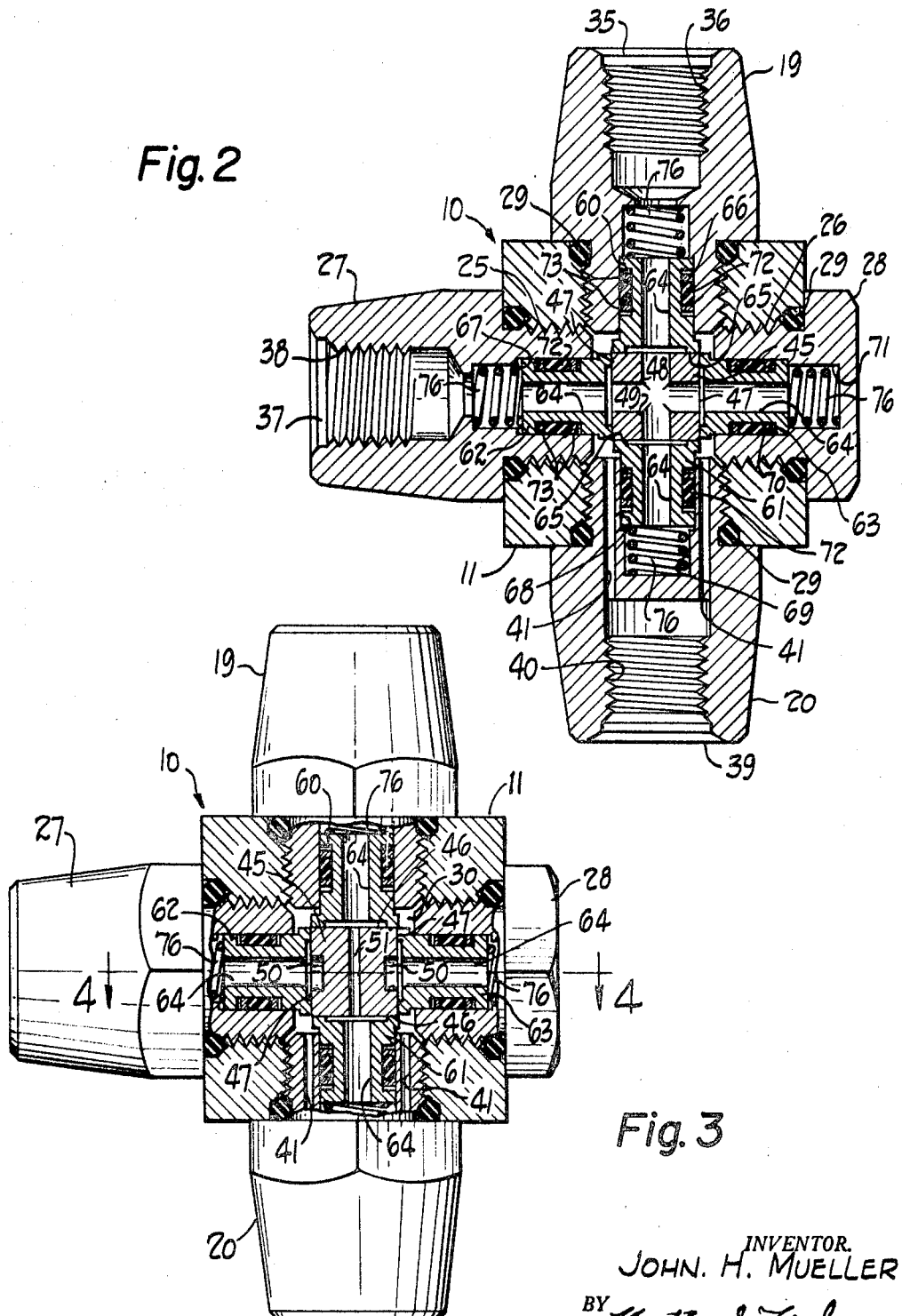

3,457,957
MULTIPLE-PORTED BALANCED SLIDE VALVES
John H. Mueller, Olmsted Township, Ohio, assignor, by mesne assignments, to Teledyne, Inc., Los Angeles, Calif., a corporation of Delaware
Filed June 8, 1966, Ser. No. 556,123
Int. Cl. F16k 11/07, 17/04, 31/60
U.S. Cl. 137—625.68                                                      11 Claims

ABSTRACT OF THE DISCLOSURE

A multiple-ported slide valve including a slide which is reciprocal between at least two positions to establish fluid communication between different ones of the ports, at least three and preferably four reciprocally mounted plunger seals arranged around the slide in equally spaced locations transverse to its longitudinal axis to guide the slide for reciprocal movement, and fluid passageway structure which permits pressurized fluid admitted to the valve to act on the ends of all of the seals to obtain a pressure balanced condition of the slide in both positions.

---

This invention relates generally to valves, and more specifically to valves of the type including a ported valve body and a valving member in the form of a slide which is reciprocal in a chamber of the valve body.

The invention is particularly concerned with a new multiple-ported slide valve having pressure seals which coact with the slide in a novel and advantageous manner. In general the preferred embodiment of the new valve has at least three ports in the valve body and two pairs of rigid, tubular plunger seals which are reciprocally mounted in the valve body and project into the slide chamber. The seals of each pair are axially aligned and project at right angles to the aligned seals of the other pair. The slide has two pairs of opposite, parallel, flat surfaces and each pair of surfaces is at right angles to the other pair of surfaces. Each flat surface of the slide is slidably engaged by the end of a plunger seal to guide the slide for reciprocal movement between two positions. In a first position of the slide, fluid communication is established between two ports of the valve and the third port is shut off. In a second slide position one of the first two ports is connected to the third port and the remaining port is shut off.

Various multiple-ported slide valves have been devised in the past and some of those valves have included pressure seals of the type described above. In the known prior constructions sealing contact has been established with only two surfaces of the slide. The present invention utilizes four sides of the slide as sealing surfaces. As will be more fully apparent from the following description, the use of four sides of the slide as sealing surfaces makes it possible to control the flow of fluid between multiple valve ports with relatively short longitudinal travel of the slide.

The novel feature of multiple-porting coupled with short longitudinal travel of the slide is embodied in a valve wherein the slide is advantageously pressure balanced in the slide chamber. In accordance with this invention, the axial passage of one plunger seal in each pair of seals is in open communication with a valve port. The slide is formed to communicate the passages of each pair of seals in each position of the slide. With this preferred construction, pressurized fluid admitted to the valve constantly acts on the outer ends of the seals in such a manner that the sealing force exerted on each side of the slide is balanced by an equal sealing force on the opposite side of the slide. The balanced sealing forces on the slide minimize the operating forces required to move the slide.

Other features and a fuller understanding of the invention will be had by reference to the following detailed description and the accompanying drawings.

In the drawings:

FIGURE 1 is a vertical cross-sectional view of the new valve and shows the slide in one of its operative positions;
FIGURE 2 is a cross-sectional view taken on the line 2—2 of FIG. 1;
FIGURE 3 is a view similar to FIG. 1, but shows the slide in another of its operative positions; and,
FIGURE 4 is a fragmentary, cross-sectional view taken generally on the line 4—4 of FIG. 3.

Referring now to the drawings, and to FIGS. 1 and 2 in particular, the illustrated embodiment of the new slide valve is generally designated by reference numeral 10. The valve 10 comprises valve body structure including a first member 11 having a longitudinal bore 12 therethrough. The ends of the bore 12 are closed by end members 13 and 14 which are threaded into the body member 11. Suitable O-ring seals 15 and 16 are provided between the valve body member 11 and the end members 13 and 14, respectively, to prevent fluid leakage between these parts.

The valve body member 11 is formed with aligned and threaded holes 17 and 18 which extend through opposite sides of the member into the central portion of the bore 12. Generally cylindrical body members 19 and 20 are threaded into the holes 17 and 18, respectively, and project beyond the sides of the body member 11. Another pair of aligned and threaded holes 25 and 26 (FIG. 2) are formed through opposite sides of the body member 11 into the central portion of the bore 12. The holes 17, 18, 25 and 26 are preferably formed so that their axes are in a common plane transverse to the longitudinal axis of the bore 12 and so that the axes of the aligned holes 17 and 18 are oriented 90° with respect to the axes of the aligned holes 25 and 26. A generally cylindrical body member 27, which may be identical to the body member 19, is threaded into the hole 25 and another body member 28 is threaded into the hole 26. O-ring seals 29 are provided between the body member 11 and the body members 19, 20, 27 and 28 to prevent fluid leakage.

The members 11, 13, 14, 19, 20, 27 and 28 together define a fluid-tight valve body having an internal slide chamber 30. A fluid port 35 is formed in the member 19 and communicates with the chamber 30 through a passage 36. Another port 37 is formed in the member 27 and communicates with the slide chamber 30 through a passage 38. A third port 39 is formed in the member 20 and communicates with the slide chamber 30 through an axial hole 40 that is partially formed through the member 20 and through spaced branch passages 41 that communicate the hole 40 with the chamber.

A slide 45 is reciprocal in the slide chamber 30 and is spaced from the walls thereof. In the preferred embodiment of the invention, the slide 45 has two pairs of opposed parallel surfaces 46 and 47 which are ground and lapped flat. As shown, the slide 45 is rectangular in cross-section and the pair of opposite parallel surfaces 46 are at right angles to the pair of surfaces 47. A first flow passage is formed in the slide 45 by internal, intersecting passages 48 and 49. The internal passage 48 is formed through the slide 45 and is ported on the opposite flat surfaces 46. The internal passage 49 is formed through the slide 45 transverse to the passage 48 and is ported on the opposite flat surfaces 47. A second flow passage in the slide 45 is defined by parallel slots 50 which are formed in the opposite slide surfaces 47. The slots 50 extend longitudinally of the slide from the end thereof and terminate at locations which are spaced from the intersecting passages 48 and 49. A third flow passage in the slide 45 is defined by an internal passage 51 which is ported on the flat surfaces 46. The axis of the slide passage 51 lies in a plane passing transversely through the slide adjacent the terminating ends of the slots 50.

A pair of oppositely disposed and axially aligned plunger seals 60 and 61 are reciprocally mounted in the valve body structure for cooperative engagement with the valve slide surfaces 46. Another pair of oppositely disposed and axially aligned plunger seals 62 and 63 are reciprocally mounted in the valve body structure for cooperative engagement with the valve slide surfaces 47. Each of the plunger seals 60–63 is in the form of a rigid, tubular sleeve having an axial fluid passage 64 therethrough and an inner end portion which projects into the slide chamber 30. The inner end of each of the plunger seals that projects into the slide chamber presents a slide-engaging annular seal face 65 of reduced cross-sectional area relative to the cross-sectional wall area of the tubular plunger seal.

As shown, the plunger seal 60 is reciprocally disposed in a recess 66 formed in the inner end of the valve body member 19. The recess 66 is preferably formed as a continuation of the inner end portion of the fluid passage 36 so that the port 35 communicates with the passage 64 of the plunger seal 60. The plunger seal 62 is similarly mounted in a recess 67 which is formed as a continuation of the inner end position of the fluid passage 38 in the valve body member 27. The plunger seal 61 is reciprocally mounted in a recess 68 formed in the inner end of the valve body member 20. The recess 68 is preferably formed as an enlarged mouth of a blind hole 69 which is located between the branch passages 41. The plunger seal 63 is mounted in a similar manner in a recess 70 formed in the inner end of the valve body member 28. The recess 70 is formed as an enlarged mouth of a blind hole 71. In order to prevent fluid leakage between the plunger seals 60–63 and the walls of the recesses in which the seals are mounted, each plunger seal is formed with a circumferential groove in its side wall and an O-ring seal 72 is mounted in the groove between backing rings 73.

The slide 45 is disposed within the chamber 30 so that the opposite flat surfaces 46 are slidably engaged by the annular faces 65 of the seals 60 and 61 and so that the opposite flat surfaces 47 are slidably engaged by the annular faces 65 of the seals 62 and 63. Each of the plunger seals 60–63 is preferably pre-loaded by a spring 76 to force the respective seals against the slide 45. The springs 76 acting on the seals 60 and 62 are respectively disposed in the fluid passages 36 and 38 between shoulders of the passages and the outer ends of the seals. The springs 76 acting on the plunger seals 61 and 63 are disposed in the blind holes 69 and 71, respectively. The pre-loading of the seals 60–63 by the springs 76 establishes initial and low pressure sealing of the annular seal faces 65 against the slide surfaces 46 and 47.

When the valve 10 is in use, the seal faces 65 of the plunger seals are urged against the slide by the combined action of fluid pressure acting on the outer ends of the seals and the force of the springs 76 to prevent cocking of the slide during operation. The slide 45 is thus maintained with its longitudinal axis parallel to the longitudinal axis of the valve chamber 30 and is guided for reciprocal movement by the plunger seals. The annular seal face 65 of each plunger seal permits fluid from the seal passage 64 to exert a hydaulic thrust on the inner end of the seal which partially balances the oppositely acting fluid pressure on the outer end of the seal. The illustrated construction of the plunger seals therefore obtains a differential piston area effect wherein each plunger seal will exert a force on the slide 45 due to fluid pressure which is equal to the fluid pressure acting on the outer end of the seal times the area of the annular seal face 65. This differential piston area effect reduces the tendency of the plunger seals to lock against the slide 45 due to excessive hydraulic thrusts on the plunger seals, whereby the slide 45 can be actuated by small endwise forces in relation to high fluid pressures within the valve. In addition, the effect of friction between the slide and the plunger seals is minimized by the reduced areas of engagement provided by the annular seal faces 65.

Reciprocal movement of the slide 45 can be accomplished in various ways which will be obvious to those skilled in the art. In the illustrated embodiment, rods 80 and 81 extend from opposite ends of the slide 45 through the end members 13 and 14, respectively. The ends of the rods 80 and 81 within the slide chamber 30 are each provided with a head 82 and these heads are engaged within generally U-shaped slots 83 formed in the end portions of the slide 45. The slots 83 are formed to provide flanges 84 which serve to retain the heads 82 within the slots. It will be apparent from FIG. 1 that the rods 80 and 81 can be engaged and disengaged from the slide 45 simply by moving the heads 82 of the rods into or out of the open ends of the slots 83. Suitable O-ring seals 85 are mounted in grooves formed between the ends of the rods 80 and 81 and serve to prevent leakage between the rods and the parts 13 and 14, respectively.

The slide 45 is normally urged into one of its positions by a spring 90. The spring 90 is disposed within a recess 91 formed in the outer end of the member 14 and within a cap 92 which is threaded onto the outer end of the member 14. The spring 90 bears against the inner end surface of the cap 92 and against a washer 93 which is fixed on the end of the rod 81. The end of the rod 80 which projects externally of the member 13 is provided with a cap 94. By applying a force to the cap 94, the slide 45 can be moved against the action of the spring 90 toward the other of its positions.

The valve 10 constructed as described above is adapted to function as a three-way, two-position flow control valve. The port 35 may be connected as the pressure port, the port 37 connected as a cylinder port, and the port 39 connected as an exhaust port. In a first operative position of the slide 45, the exhaust port 39 is shut off and the pressure port 35 is communicated with the cylinder port 37. In a second operative position of the slide 45, the pressure port 35 is shut off and the cylinder port 37 is communicated with the exhaust port 39 via the slide chamber 30. In both slide positions a balanced sealing force is exerted on opposite sides of the slide by the seals 60–63. The balanced sealing force is obtained by maintaining the passages 64 of the seals 60 and 61 in fluid communication and by maintaining the passages 64 of the seals 62 and 63 in fluid communication.

When the slide 45 is disposed within the slide chamber 30 in the manner illustrated in the drawings, the slide is urged by the spring 90 into the first operative position. In this first slide position which is shown in FIGS. 1 and 2, the ports of the slide passage 48 lie within the annular seal faces 65 of the plunger seals 60 and 61, and the ports of the intersecting passage 49 lie within the annular seal faces of the plunger seals 62 and 63. The intersecting slide passages 48 and 49 thus cooperate to establish mutual fluid communication between the passages 64 of all four of the plunger seals 60–63. Pressurized fluid admitted to the pressure port 35 of the valve 10 flows through the passage 36, the plunger seal 60, the intersecting slide passages 48 and 49, and then through the plunger seal 62 and the passage 38 to the cylinder port 37. The seals 60–63 block fluid flow from the passages 48 and 49 into the slide chamber 30 and therefore the exhaust port 39 which is in open communication with the chamber is shut off.

Since the passages 64 of all four of the plunger seals 60–63 are communicated by the intersecting slide passages 48 and 49 when the slide is in the position shown in FIGS. 1 and 2 the pressurized fluid acts on the outer ends of the four plunger seals to force their annular faces 65 against the flat slide surfaces 46 and 47. The sealing force exerted on one surface 46 of the slide 45 due to the fluid pressure loading on the plunger seal 60 is equal to the sealing force exerted on the opposite surface 46 of the slide by the fluid pressure loading on the plunger seal 61. In a similar manner the sealing force exerted on one surface 47 of the slide due to the fluid pressure loading on the plunger seal 62 is equal to the force exerted on the opposite side 47 of the slide by the fluid pressure loading on the plunger seal 63. Thus, the slide 45 is pressure balanced within the slide chamber 30. This pressure balanced condition of the slide 45 minimizes the forces necessary to move the valve slide 45 to the second position shown in FIGS. 3 and 4.

When the slide 45 is in the position shown in FIGS. 3 and 4, the slot 50 in the surface of the slide engaged by the plunger seal 62 establishes fluid communication between the passage 64 of that plunger seal and the slide chamber 30. Since the slide 45 is operatively spaced from the passages 41 that communicate the exhaust port 39 to the slide chamber 30, fluid communication between the ports 37 and 39 is established via the slide chamber 30. Fluid from the cylinder port 37 flows through the passage 38, the plunger seal 62 and into the chamber 30 through the slot 50 in the slide surface engaged by the seal 62. The fluid admitted to the slide chamber 30 is then communicated through the passages 41 and 40 to the exhaust port 39. At the same time, the slide 45 blocks fluid flow from the pressure port 35 to the cylinder port 37 and the slide chamber 30.

The preferred construction of the valve 10 maintains a pressure balanced condition of the slide 45 in the position of FIGS. 3 and 4. The fluid admitted to the slide chamber 30 from the cylinder port 37 is communicated to the passage 64 of the plunger seal 63 by the slot 50 formed in the surface of the slide engaged by the seal 63. Since the fluid admitted to the valve through the cylinder port 37 acts on the outer ends of both seals 62 and 63, the force exerted on one side of the slide 45 due to the fluid pressure loading on the plunger seal 62 is equal to the force exerted on the opposite side of the slide by the fluid pressure loading on the plunger seal 63. The slide passage 51 establishes fluid communication between the passages 64 of the plunger seals 60 and 61. The pressurized fluid admitted to the valve 10 through the pressure port 35 therefore acts on the outer ends of both of the seals 60 and 61 so that the force exerted on one side 46 by the seal 60 is equal to the force exerted on the opposite side 46 of the slide by the seal 61.

If desired, the operative position of the slide 45 in the chamber 30 can be reversed from that shown in the drawings. When the slide is reversed, the slide passage 50 is placed in communication with the passages 64 of the plunger seals 60 and 61 by the action of the spring 90 so that the pressure port 35 is shut off and the cylinder port 37 is connected to the exhaust port 39. The slide 45 is moved to its other position by applying a force to the cap 94 to bring the slide passages 48 and 49 into communication with the plunger seal passages 64.

It will be apparent that the invention provides a new slide valve construction having multiple-porting and a novel valving action. As mentioned above, an important feature of the new construction resides in the arrangement of the plunger seals so as to establish sealing contact with all four sides of the slide and the manner in which the slide and seals cooperate to control the flow of fluid through the valve between the various ports. The use of all four sides of the slide as sealing surfaces makes is possible to control the flow of fluid between multiple ports with relatively short longitudinal travel of the slide. The novel arrangement of the plunger seals and the porting of the slide are also such as to obtain a constant pressure balanced condition of the slide in a multiple-ported valve.

Another important feature of the invention resides in the simplicity of the new valve construction. In the illustrated embodiment, the novel sealing of the plunger seals against the slide is made possible simply by grinding and lapping the four sides of the slide square and parallel. The valve body structure is comprised of identical members 19 and 27 and nearly identical members 13 and 20 which are threaded into holes formed in the valve body member 11. It will thus be seen that the valve can be manufactured without costly machining operations and that it can be easily assembled.

The novel features of the invention have been shown and described as embodied in a new three-way, two-position flow control valve. The construction of this valve is such that the pressure port is communicated to a cylinder port and the exhaust port is shut off in one position of the slide, and the pressure port is shut off and the cylinder port is communicated to the exhaust port in the other position of the slide. The novel features can obviously be embodied in flow control valves having different porting arrangements, as well as in other types of valves including directional control valves.

What is claimed is:
1. A slide valve comprising in combination:
 (a) valve body structure including:
  (i) a slide chamber,
  (ii) at least three ports,
 (b) a slide structure longitudinally movable in said chamber,
 (c) said structures having flow passages communicable with said ports,
 (d) said slide structure being movable between:
  (i) one position establishing fluid communication between a first two of said ports,
  (ii) another position establishing fluid communication between one of said first two ports and a third port,
 (e) at least three seals arranged around said slide structure in equally spaced locations transverse to the longitudinal axis of said slide,
 (f) each of said seals having one end portion reciprocally mounted in one of said structures and an opposite end portion projecting into said chamber and slidably engaging the other of said structures to guide said slide structure for movement between said positions,
 (g) and said seals and said flow passages being formed to provide fluid communication to said one end portions of all of said seals in each of said positions of said slide structure so that said slide structure is pressure balanced within said chamber.

2. A slide valve comprising in combination:
 (a) valve body structure including:
  (i) a slide chamber,
  (ii) at least three ports,
 (b) a slide structure longitudinally movable in said chamber,
 (c) said structures having flow passages communicable with said ports,
 (d) first and second pairs of seals arranged around said slide structure in equally spaced locations transverse to the longitudinal axis of said slide structure,
 (e) each of said seals having one end portion reciprocally mounted in one of said structures and an opposite end portion which projects into said chamber in sliding engagement with the other of said structures, thereby to guide said slide structure for movement between a first position establishing fluid communication between a first two of said ports and a second position establishing fluid communication between one of said first two ports and a third port,
 (f) and said seals of each pair being disposed on diametrically opposite sides of said slide structure and having their said one end portions in mutual fluid communication in each position of said slide structure, whereby said slide structure is pressure balanced within said chamber.

3. A valve as claimed in claim 2 wherein all of said seals are reciprocally mounted in a common one of said structures.

4. A slide valve combintion:
(a) valve body structure including:
   (i) a slide chamber,
   (ii) at least three ports,
(b) a slide longitudinally movable in said chamber,
(c) said slide having first and second pairs of opposed parallel and flat surfaces,
(d) first and second pairs of plunger seals reciprocally mounted in said valve body structure around said slide,
(e) each of said plunger seals having a passage therethrough and an end portion which projects into said chamber and presents an annular seal face,
(f) said first and second pairs of slide surfaces being slidably engaged by said seal faces of said first and second pairs of plunger seals, respectively, thereby to guide said slide for movement between first and second positions,
(g) one of said plunger seals of each pair having its passage in constant fluid communication with a different one of said ports,
(h) said slide having a plurality of flow passages which provide fluid communication between said fluid passages of said first pair of seals and between said fluid passages of said second pair of seals in each of said slide positions so that said slide is pressure balanced within said chamber,
(i) and means for actuating said slide from one position to another position.

5. A valve as claimed in claim 4 wherein said flow passages of said slide include:
   (i) a first flow passage communicating a first valve port to a second valve port in said first slide position,
   (ii) a second flow passage communicating said first valve port to a third valve port in said second slide position.

6. A valve as claimed in claim 5 wherein:
   (i) said third valve port is in constant fluid communication with said chamber,
   (ii) said second flow passage is formed by slots in said second pair of slide surfaces, said slots establishing fluid communication between said chamber and the annular seal faces of said second pair of plungers in said second slide position.

7. A valve as claimed in claim 5 wherein said first flow passage of said slide is formed by intersecting internal passages which are ported on said slide surfaces and which communicate with all of said seal passages in said first slide position.

8. A valve as claimed in claim 5 wherein said flow passages of said slide include a third flow passage formed by internally connected ports on said first pair of slide surfaces, said third flow passage communicating the passages of said first pair of seals in said second slide position.

9. A slide valve comprising in combination:
(a) valve body structure including:
   (i) a slide chamber,
   (ii) at least first, second and third ports, said third port being in open fluid communication with said chamber,
(b) a slide longitudinally reciprocal in said chamber between first and second positions,
(c) said slide having first and second pairs of parallel, flat surfaces, the surfaces of each pair being on opposite sides of said slide and lying in imaginary planes which are at right angles to imaginary planes containing the other pair of surfaces,
(d) first and second pairs of plunger seals reciprocally mounted in said valve body structure,
(e) each of said seal having a passage therethrough and an end portion which projects into said chamber and presents an annular seal face,
(f) said annular seal faces of said first pair of seals being in sliding engagement with said first pair of surfaces and said annular seal faces of said second pair of seals being in sliding engagement with said second pair of surfaces, thereby to guide said slide for reciprocal movement,
(g) the passage of one seal in said first pair of seals being in constant fluid communication with said first port and the passage of one seal in said second pair of seals being in constant fluid communication with said second port,
(h) said slide having:
   (i) internally connected ports on said surfaces which communicate the passages of all of said seals in said first slide position,
   (ii) slots formed in said second pair of surfaces which communicate the passages of said second pair of seals with said chamber when said slide is in said second position,
   (iii) a transverse passage which is ported on said first pair of surfaces and which communicates the passages of said first pair of seals in said second position,
(i) means for urging said slide toward one of said positions,
(j) and means for forcing said slide to the other of said positions.

10. A valve as claimed in claim 9 wherein said valve body structure has blind holes opening into said chamber, and wherein a seal of each pair of seals is mounted in a different one of said holes.

11. A valve as claimed in claim 9 wherein the seals of each pair of seals are in axial alignment.

References Cited

UNITED STATES PATENTS

| | | | |
|---|---|---|---|
| 2,964,058 | 12/1960 | Fuente | 137—625.25 |
| 2,986,165 | 5/1961 | Hogan | 137—625.25 |
| 3,147,771 | 9/1964 | Elbogen et al. | 251—282 X |
| 3,324,888 | 6/1967 | Henderson | 137—625.68 |

FOREIGN PATENTS

| | | |
|---|---|---|
| 949,202 | 9/1956 | Germany. |

M. CARY NELSON, Primary Examiner

JOHN R. DWELLE, Assistant Examiner

U.S. Cl. X.R.

137—625.25; 251—282